(12) United States Patent
Aloisi

(10) Patent No.: US 12,338,786 B2
(45) Date of Patent: Jun. 24, 2025

(54) SUBAQUATIC POWER GENERATION SYSTEMS

(71) Applicant: Matthew Aloisi, Nantucket, MA (US)

(72) Inventor: Matthew Aloisi, Nantucket, MA (US)

( * ) Notice: Subject to any disclaimer, the term of this patent is extended or adjusted under 35 U.S.C. 154(b) by 0 days.

(21) Appl. No.: 18/825,068

(22) Filed: Sep. 5, 2024

(65) Prior Publication Data

US 2025/0084818 A1    Mar. 13, 2025

Related U.S. Application Data

(60) Provisional application No. 63/581,154, filed on Sep. 7, 2023.

(51) Int. Cl.
| | |
|---|---|
| *F03B 13/26* | (2006.01) |
| *F03B 7/00* | (2006.01) |
| *F03B 17/06* | (2006.01) |

(52) U.S. Cl.
CPC .............. *F03B 7/00* (2013.01); *F03B 13/264* (2013.01); *F03B 17/06* (2013.01)

(58) Field of Classification Search
CPC ........... F03B 7/00; F03B 13/264; F03B 17/06
See application file for complete search history.

(56) References Cited

U.S. PATENT DOCUMENTS

| | | | |
|---|---|---|---|
| 6,759,757 B1 | 7/2004 | Campbell | |
| 8,164,209 B2* | 4/2012 | Rovinsky | F03B 17/061 290/52 |
| 8,350,396 B2 | 1/2013 | Dempster | |
| 12,163,500 B2* | 12/2024 | Lin | F03B 13/264 |
| 2006/0245919 A1* | 11/2006 | Krizik | F03B 7/00 415/202 |

(Continued)

FOREIGN PATENT DOCUMENTS

| | | | |
|---|---|---|---|
| EP | 2946107 B1 | 2/2019 | |
| GB | 2445284 A | 7/2008 | |
| WO | WO-2004055365 A1 * | 7/2004 | ............ F03B 17/061 |

OTHER PUBLICATIONS

International Patent Application No. PCT/US2024/045247, International Search Report dated Dec. 16, 2024, 3 pages.

(Continued)

*Primary Examiner* — Aaron R Eastman
(74) *Attorney, Agent, or Firm* — Leber IP Law; Celia H. Leber

(57) ABSTRACT

The disclosure features subaquatic power generation systems and methods of their use in bodies of water. Some implementations feature a subaquatic power generation system that includes (a) a housing having an inlet, an outlet, and, between the inlet and outlet, a channel through which water can pass in a fluid flow direction, and a power generating area defining a watertight and airtight chamber configured to provide an air pocket within the housing when the housing is fully submersed in water; and (b) a waterwheel disposed within the power generating area such that a longitudinal axis of the waterwheel is oriented generally horizontally and generally perpendicular to the fluid flow direction, an upper portion of the waterwheel is disposed within the chamber, and a lower portion of the waterwheel is disposed within the channel and acted upon by fluid flow through the channel.

22 Claims, 10 Drawing Sheets

(56) References Cited

U.S. PATENT DOCUMENTS

| | | | |
|---|---|---|---|
| 2009/0026767 A1* | 1/2009 | Petrounevitch | F03B 13/264 415/121.2 |
| 2009/0322091 A1* | 12/2009 | Jack | F03B 17/063 290/53 |
| 2011/0309624 A1* | 12/2011 | Ettanoor Thuppale | F03B 3/18 415/1 |
| 2012/0119501 A1* | 5/2012 | Yeomans | F03B 17/064 290/54 |
| 2013/0069369 A1* | 3/2013 | Salehpoor | F03B 13/264 290/55 |
| 2013/0229014 A1* | 9/2013 | Willingham | F03B 17/063 290/54 |
| 2014/0241855 A1* | 8/2014 | Han | F03B 15/12 415/60 |
| 2015/0252776 A1* | 9/2015 | Van Rompay | F03B 17/063 290/54 |
| 2015/0354528 A1* | 12/2015 | Van Rompay | F03B 13/10 290/54 |
| 2016/0061183 A1* | 3/2016 | Orij | F03B 17/065 415/141 |
| 2016/0348641 A1* | 12/2016 | Jessamy | F03B 17/063 |
| 2017/0074232 A1* | 3/2017 | Shin | F03B 13/264 |
| 2019/0128239 A1* | 5/2019 | Kristensen | F01D 15/10 |
| 2019/0257281 A1* | 8/2019 | Raina | F03B 13/264 |
| 2021/0095635 A1* | 4/2021 | DeRan | F03B 17/06 |
| 2021/0123410 A1* | 4/2021 | Oh | F03B 17/063 |
| 2021/0246866 A1* | 8/2021 | Blodgett | F03B 17/06 |
| 2022/0242532 A1* | 8/2022 | Power, III | B60F 3/0061 |
| 2022/0403814 A1* | 12/2022 | Smith | F03B 13/26 |
| 2024/0151205 A1* | 5/2024 | Mathers | F03B 13/268 |
| 2024/0295089 A1* | 9/2024 | Smith | F03B 17/06 |

OTHER PUBLICATIONS

International Patent Application No. PCT/US2024/045247, Written Opinion dated Dec. 16, 2024, 6 pages.

* cited by examiner

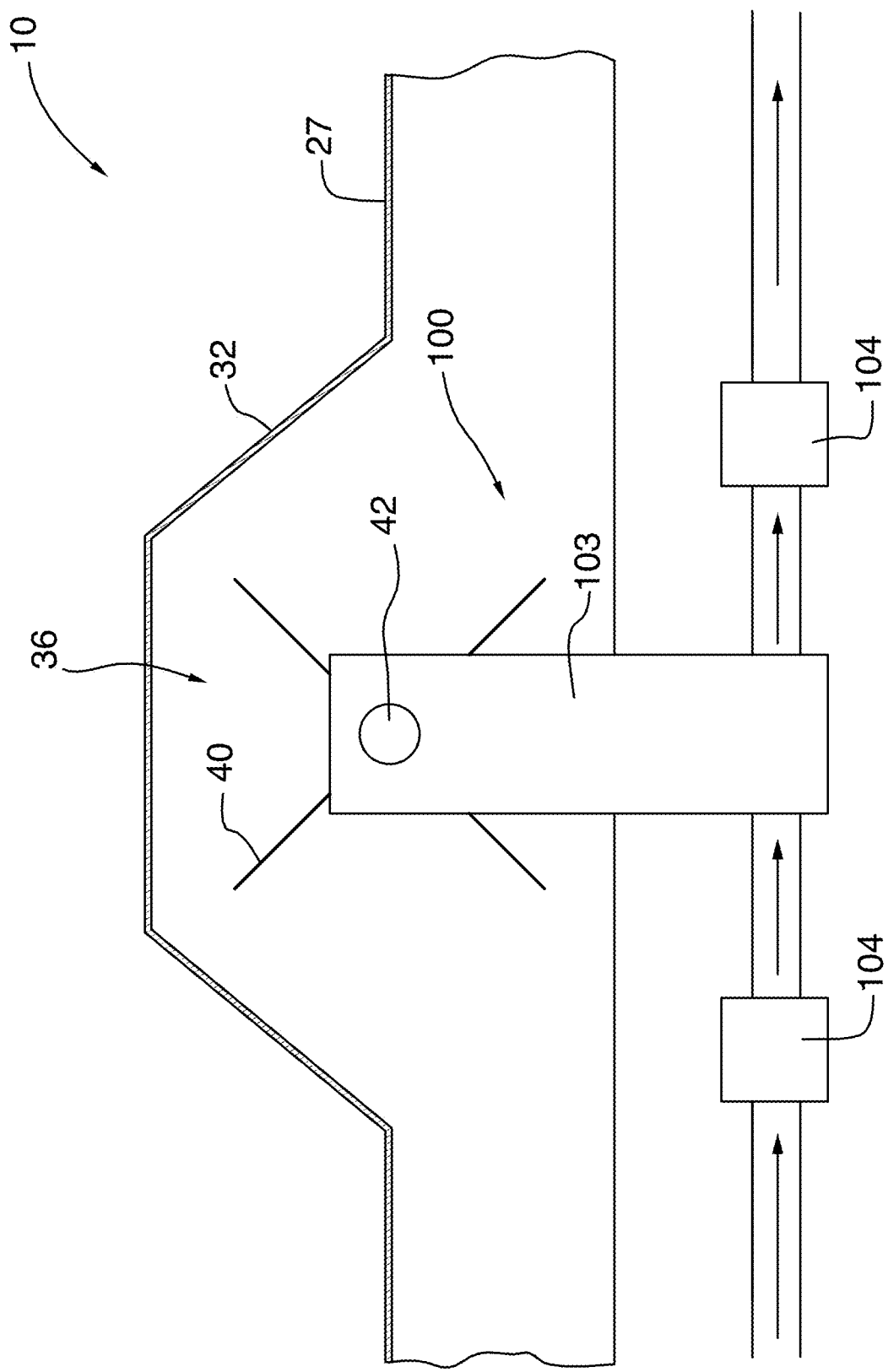

SUBAQUATIC POWER GENERATION SYSTEMS

RELATED APPLICATION

This application claims priority from U.S. Patent Application No. 63/581,154, filed Sep. 7, 2023, which is incorporated herein by reference in its entirety.

BACKGROUND

Water in motion has long been used to generate electricity, using turbines and generators, a process known as hydroelectric power generation. Efforts are being made to use tidal currents such as are found in straits and inlets by placing tidal turbines in areas with high tidal ranges and strong currents. These turbines are generally placed where underwater cables can transmit the power generated to the power grid.

Greater implementation of tidal power generation systems would provide abundant clean energy and thus greatly assist with combating climate change. However, various challenges to the utilization of these systems exist, including environmental concerns such as fish and other aquatic species being exposed to rotating turbines, equipment in marine environments disrupting the surrounding ecosystem, the economics of the cost of the system and transferring the energy to the grid vs. the amount of energy that can be generated, and interference with shipping channels by placement of the power generating equipment.

SUMMARY

The present disclosure features subaquatic power generation systems, i.e., power generation systems that in use are located entirely underwater. These systems can be positioned and anchored on or near the bed of a body of water such as a tidal strait or a river bed. The systems are generally used in areas of relatively high current (e.g., 2 knots to 5 knots and greater), whether tidal current running intermittently in two opposite directions or a river current or ocean current (e.g., the Gulf Stream) running continuously in a single direction.

The systems include one or more waterwheels, each waterwheel having an elongated rotational axis such that the waterwheel is more cylindrical than wheel shaped. For example, the length of the rotational axis may be at least two times, and up to 10 times or more, greater than the diameter of the waterwheel.

The waterwheels are disposed within a housing that surrounds the waterwheels in a manner to allow an upper portion of each waterwheel to be positioned in an air pocket rather than submersed in water, thereby allowing free rotation of the waterwheel's backstroke in response to the force of the current. The waterwheel thus operates as an undershot waterwheel, despite being in an underwater location. Each waterwheel is positioned in the housing such that its rotational axis is oriented horizontally and perpendicular to the direction of the flow of water through the housing. In preferred implementations the housing includes a portion that is configured to accelerate fluid entering the housing using the Venturi effect.

In one aspect, the disclosure features a subaquatic power generation system comprising: (a) a housing having an inlet, an outlet, and, between the inlet and outlet, a channel through which water can pass in a fluid flow direction, and a power generating area defining a watertight and airtight chamber configured to provide an air pocket within the housing when the housing is fully submersed in water; and (b) a waterwheel disposed within the power generating area such that a longitudinal axis of the waterwheel is oriented generally horizontally and generally perpendicular to the fluid flow direction, an upper portion of the waterwheel is disposed within the chamber, and a lower portion of the waterwheel is disposed within the channel and acted upon by fluid flow through the channel.

Some implementations include one or more of the following features.

The waterwheel has a diameter and a length, and the length of the waterwheel is greater than its diameter.

The air pocket is located directly above the channel and the channel defines a maximum water level within the housing.

The longitudinal axis of the waterwheel is positioned to be approximately at the maximum water level.

The housing further includes a venturi constriction disposed between the inlet and the power generating area, the venturi constriction being configured to accelerate fluid flow through the channel.

The housing includes a second venturi constriction disposed between the power generating area and the outlet.

The housing is configured for fluid flow in the fluid flow direction and a second, opposite direction, in response to tidal currents.

The system includes a plurality of waterwheels positioned in the power generating area. The plurality of waterwheels may be disposed in separate modular portions of the power generating area configured to allow a waterwheel to be easily removed from the system.

The waterwheel comprises an axle and a plurality of paddles extending outwardly from the axle.

The system further includes a plunger pump assembly mounted on the axle such that rotation of the axle actuates the plunger pump assembly.

In another aspect, the disclosure features a method of subaquatic power generation, the method including (a) providing a subaquatic power generation system as discussed above, and (b) positioning the system in a body of water such that the housing is entirely submersed in water.

Some implementations of the method include one or more of the following features.

The positioning step comprises resting a lower surface of the housing on a bed of the body of water.

The method further includes orienting the housing such that the fluid flow direction through the channel corresponds to a current direction in the body of water.

The method further includes anchoring the housing to prevent unwanted movement of the system.

The method further includes converting kinetic energy produced by the waterwheel to electricity.

The method further includes utilizing the venturi effect to accelerate flow of water within the housing.

The method further includes utilizing an outer surface of the housing as an artificial reef.

The body of water comprises a tidal strait or river. The method may include configuring the housing to extend across from 20% to 80% of a width of the tidal strait or river.

Within this specification embodiments have been described in a way which enables a clear and concise specification to be written, but it is intended and will be appreciated that embodiments may be variously combined or separated without parting from the invention. For

DESCRIPTION OF THE DRAWINGS

FIG. 9 is a diagrammatic side view of a plunger pump assembly mounted on an axle of a waterwheel.

DETAILED DESCRIPTION

The present disclosure features subaquatic power generation systems that are particularly suited for use in tidal straits, where current flows in opposite directions with the incoming and outgoing tides.

Figure 1:
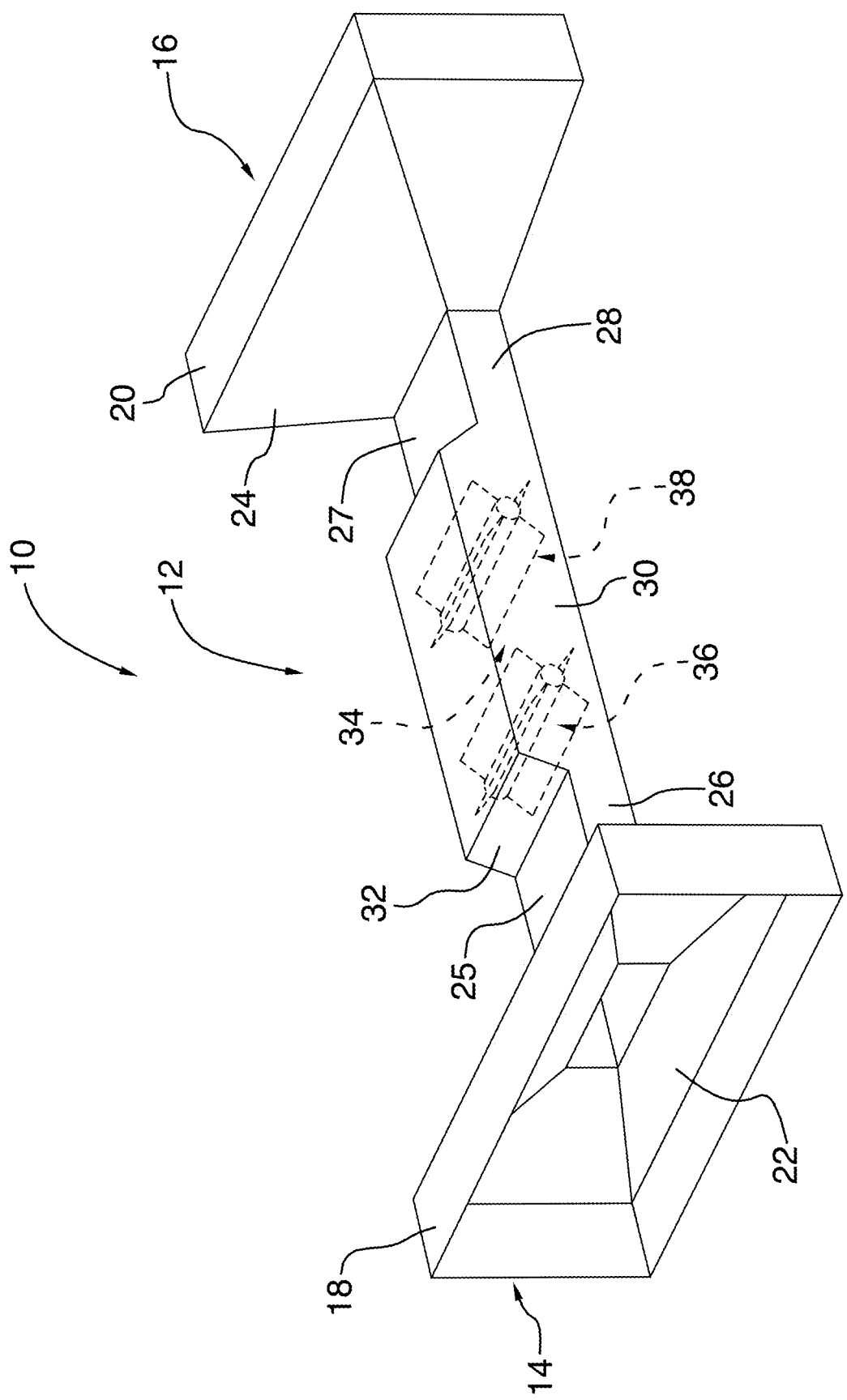
FIG. 1 is a perspective view of a subaquatic power generation system according to one implementation, with the waterwheels shown in broken lines.

Referring to FIG. 1, a subaquatic power generation system 10 according to one implementation includes a housing 12. Housing 12 includes, at opposite ends, two inlet/outlet areas 14, 16, through which water can enter and exit the housing, each formed by a generally rectangular flange 18, 20. Flanges 18, 20 project in the direction of axis A of the housing (FIG. 2), which corresponds to the direction of fluid flow through the housing. In use, water flows (depending on the prevailing direction of the current) into one or the other of the inlet/outlet areas 14, 16, through an adjoining funnel area 22, 24, and thus into a constriction 26, 28, having a cross-sectional area less than that of the rectangular flanges 18, 20, which accelerates the flow rate of the water due to the Venturi effect.

The central portion 30 of the housing includes an area 32 that is elevated above the upper walls 25, 27 of the constrictions 26, 28, and thus defines an airtight/watertight sealed chamber 34 that provides an air pocket above the water level when water is flowing through the housing.

Figure 2:
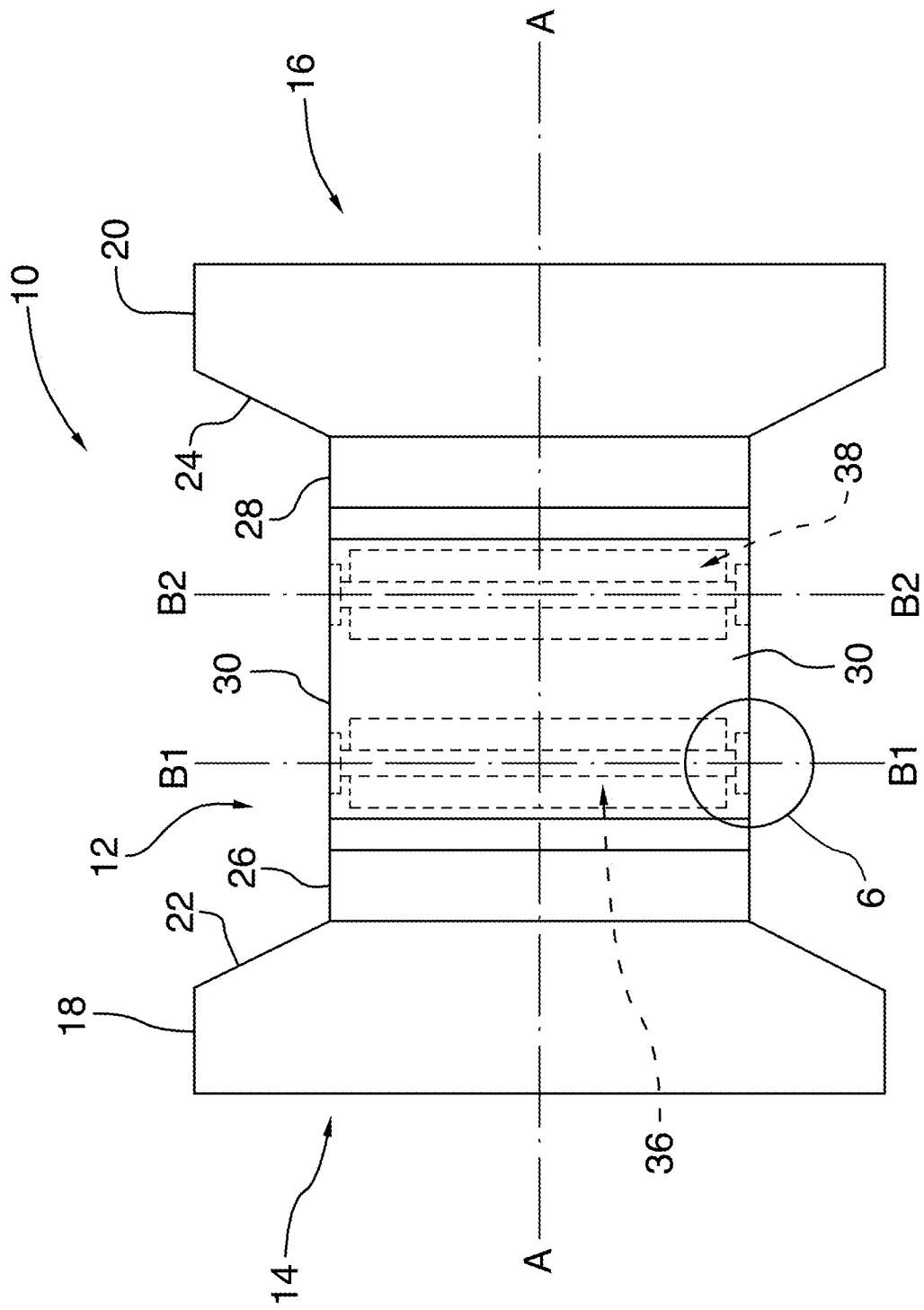
FIG. 2 is a top view of the system shown in FIG. 1.
Figure 3:
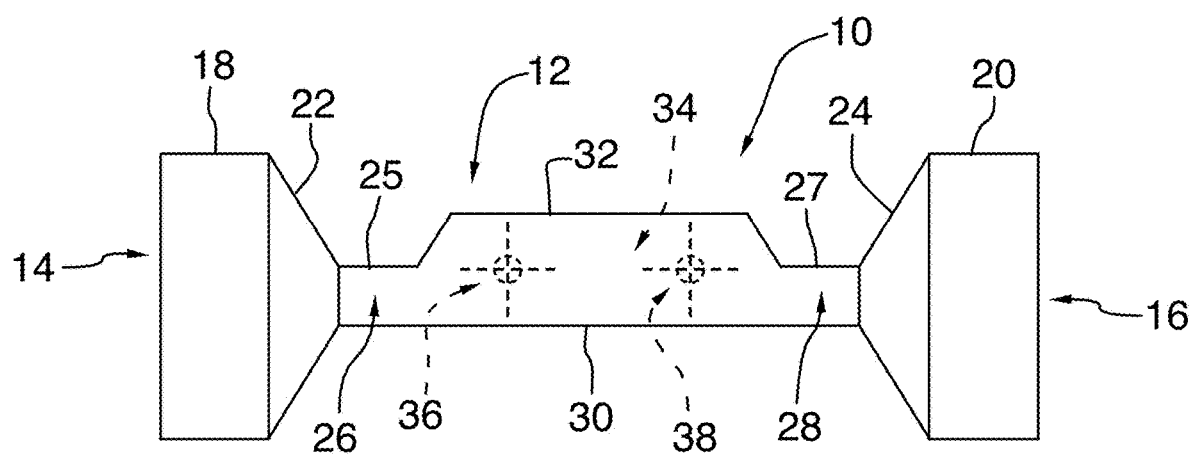
FIG. 3 is a side view of the system shown in FIG. 1.
Figure 4:
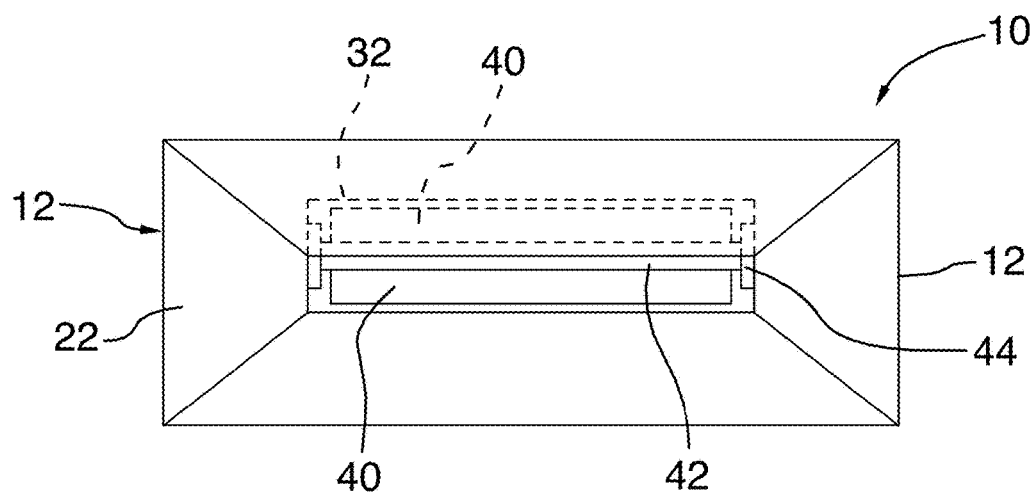
FIG. 4 is a front view of the system shown in FIG. 1.

Two waterwheels 36, 38, are disposed in the central portion 30 of the housing. As can be seen in FIGS. 1 and 2, the waterwheels are oriented such that their longitudinal axes B1, B2 (FIG. 2) extend crosswise to the axis A of the housing 12, and thus perpendicular to the direction of flow of water through the housing. The waterwheels are also oriented horizontally, as shown in FIG. 3.

Figure 5:
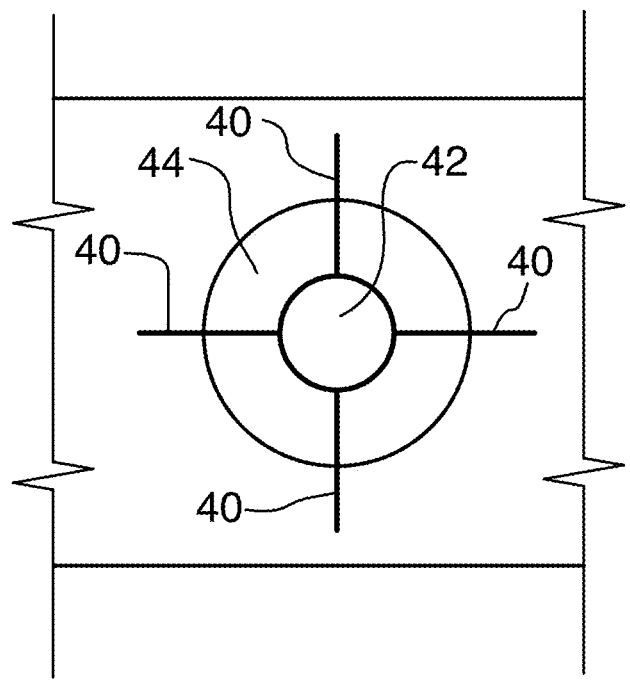
FIG. 5 is an enlarged detail side view of one of the waterwheels in the system shown in FIG. 1.
Figure 7:
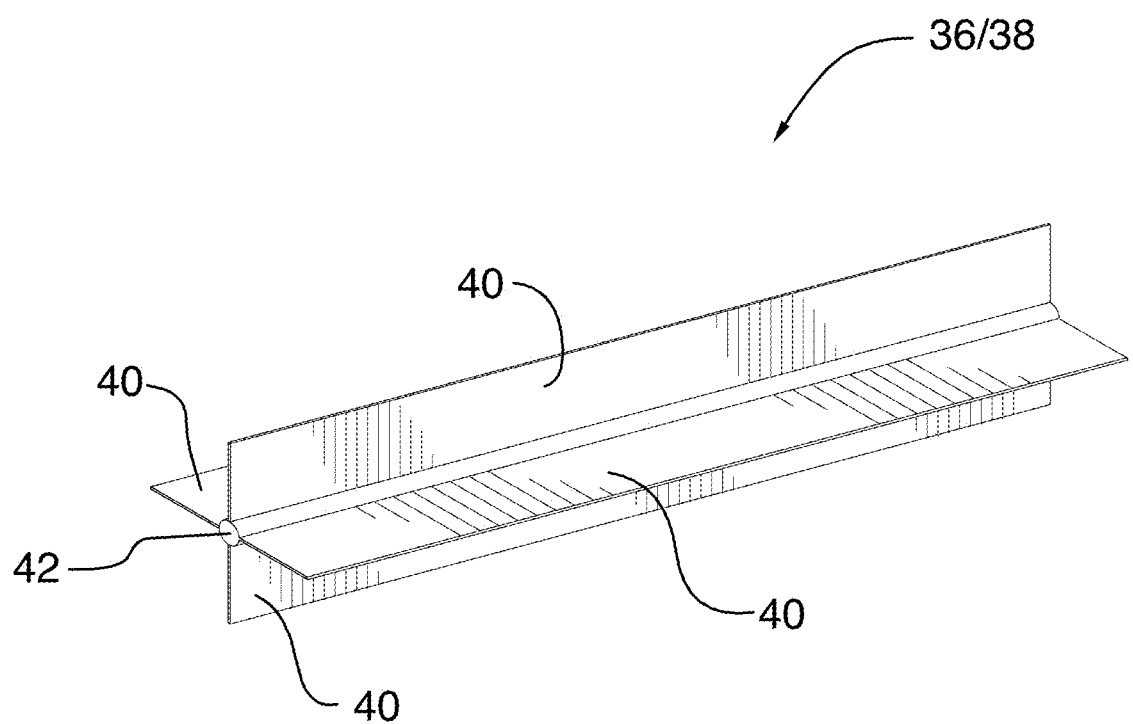
FIG. 7 is a perspective view of a waterwheel according to one aspect of the invention.

Referring to FIGS. 5 and 7, each waterwheel includes four paddles 40 that extend directly from a central axle 42 (rather than being disposed around the periphery of a rim, as is often the case in conventional waterwheels). This configuration provides the waterwheel with a desirably low profile, an important consideration in applications where the system is height constrained. For example, this allows the system to be used in areas of height restriction, e.g., on the floor of a shipping canal or recreational waterway. The low profile is also advantageous if the system is to be used in a shallow water location where it is important that the system be submersed under the water.

In preferred implementations, as can be seen in FIG. 7 the length of the waterwheel is much greater than the effective diameter defined by the rotating waterwheel, i.e., the distance from the tip of one paddle to the tip of the diametrically opposite paddle. The elongated nature of the waterwheel presents a large surface area to the flowing current, to maximize power generation, while maintaining the desirably low profile. For example, in some implementations the length of the waterwheel may be from 2 to 10 times the effective diameter of the waterwheel. In applications in which the system is placed in a waterway, such as a canal or river, the length of the waterwheel (or a plurality of waterwheels arranged end to end) could be close to the width of the waterway. For example, the length of the waterwheel(s) can be from about 20% to 80% of the width of the waterway. This is possible because the system can be positioned on or close to the bed of the waterway, such that it does not interfere with boat traffic in the waterway.

Positioning each waterwheel so that its upper portion (in some implementations the upper half of the waterwheel) is in the air pocket defined by chamber 34 allows the waterwheel's upper portion to turn freely when the current applies force to the immersed paddles. In other words, the air pocket allows the waterwheels to function as undershot waterwheels, despite the system being located entirely underwater. When positioned such that the upper half of the waterwheel is in the air pocket the water level in the housing reaches the axle 42, i.e., the longitudinal axis, of the waterwheel.

Figure 6:
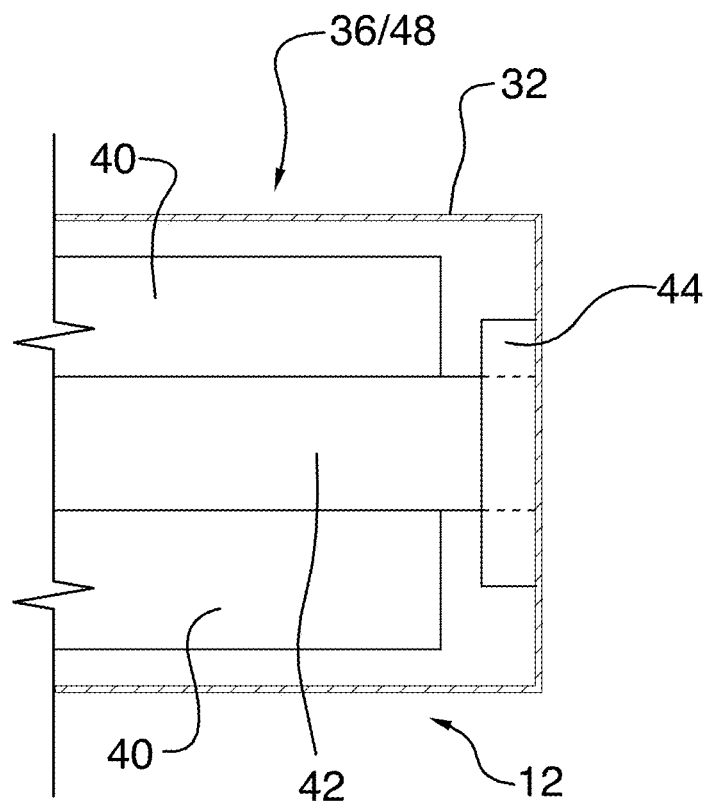
FIG. 6 is an enlarged detail view showing the area labeled "6" in FIG. 2, where an end of the waterwheel is rotatably mounted on the housing.

The waterwheels 36/38 are mounted to the housing 12 using bearing assemblies 44, as shown diagrammatically in FIGS. 5 and 6. The bearing assemblies 44 support axles 42 and allow the axles to rotate freely in response to the force applied by the current with minimal frictional loss.

Figure 8:
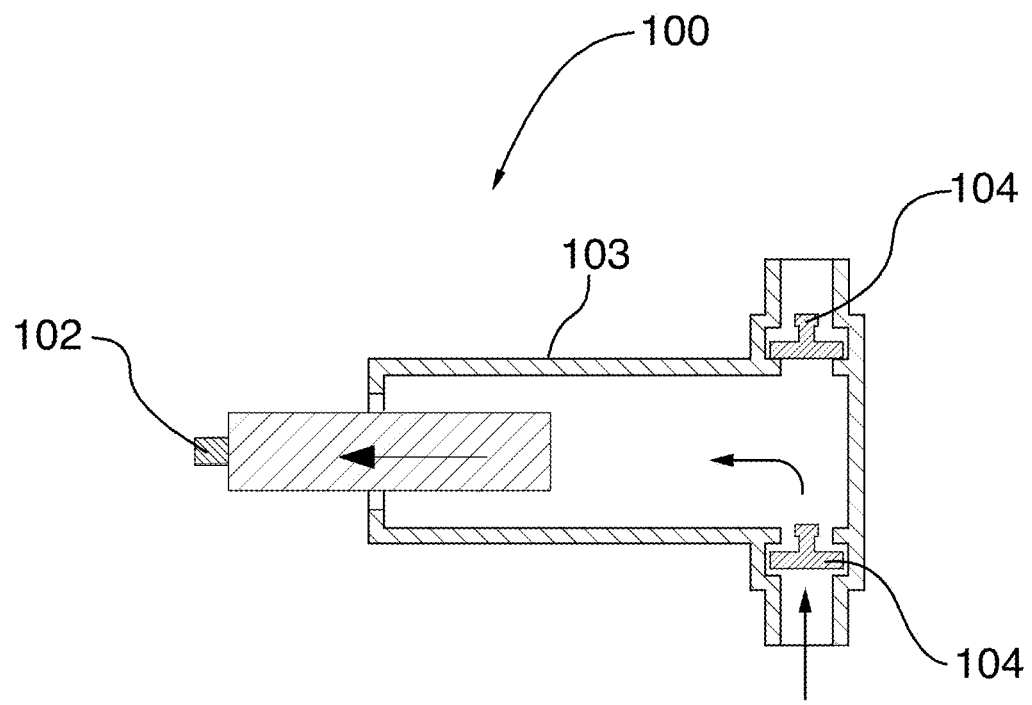
FIG. 8 is a diagrammatic cross-sectional view of a plunger pump assembly in a first position.
Figure 8A:
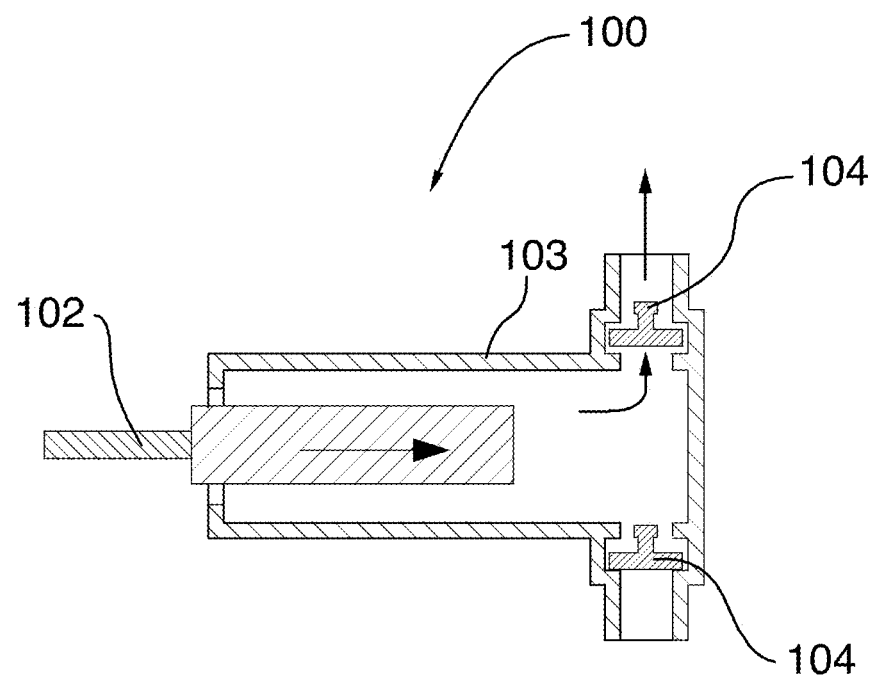
FIG. 8A is a diagrammatic cross-sectional view of the plunger pump of FIG. 8 in a second position.

The kinetic energy produced by the rotation of the waterwheels can be converted to electricity in any desired manner. In one implementation, the shaft 102 of the plunger 104 of a plunger pump 100, shown diagrammatically in FIGS. 8 and 8A, is attached to the end of each axle 42. (In this implementation one end of each axle 42 extends outside of the housing 12 through a water tight seal to provide this connection.) Plunger pump 100 includes a housing 103 and a pair of check valves 104. The installed plunger pump is shown diagrammatically in FIG. 9 with flow of water through the plunger pump system being indicated by arrows. The plunger pumps pump water to a non-submersed storage tank (not shown) close by, for example on shore. From the storage tank the water is gravity fed through a hydro turbine, generating electricity, and back into the body of water. The electricity can then be transmitted to the power grid or used locally.

Figure 10:
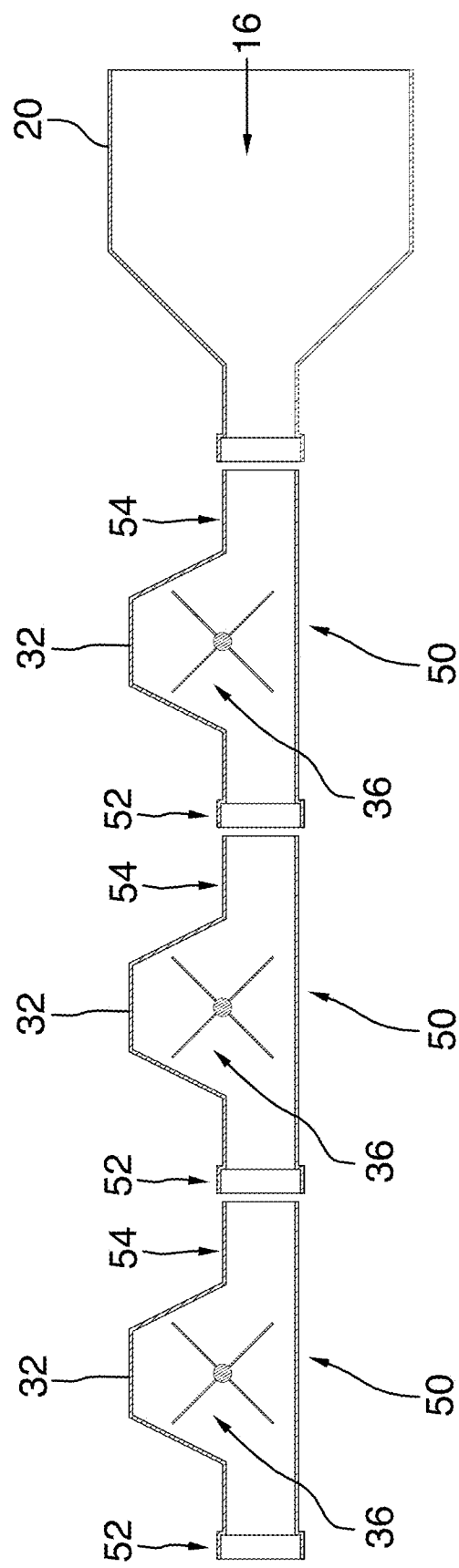
FIG. 10 is a diagrammatic side cross-sectional view of a portion of a subaquatic power generation system that includes multiple modules, each module containing a waterwheel.

To avoid or mitigate fouling (e.g., by barnacles and the like) and protect fish and other wildlife, a screen can be provided at the inlet and outlet of the housing. The paddles can be coated with an anti-fouling coating or have a nano-textured anti-fouling surface. The housing may also be configured to allow the waterwheels to be easily removed for maintenance and replaced as needed. For example, as shown in FIG. 10 the system may include a plurality of modules 50, coupled together in series by joining a flanged end 52 of one module to a tubular end 54 of an adjacent module. These couplings need not be water tight and thus the modules can be joined together in a manner to allow easy removal and replacement of a module in need of maintenance or repair.

Because of the air pocket provided within the housing, the housing is buoyant and will generally need to be anchored to keep it submersed and also to avoid undesirable movement of the system. This may be accomplished in a number of ways, for example by attaching the system to piers or other permanent structures, mounting the system under a barge, or attaching anchors to the device of sufficient weight to stabilize the system in a desired underwater location.

In some implementations the upper outer surface of the housing can serve a purpose. For example, the upper outer surface can be configured for use as an artificial reef or as an artificial habitat structure for marine wildlife conservation projects.

Other Embodiments

A number of embodiments have been described. Nevertheless, it will be understood that various modifications may be made without departing from the spirit and scope of the disclosure.

For example, while two waterwheels are shown in the drawings by way of example, the system may include a single waterwheel or more than two waterwheels, for example four or more, with their longitudinal axes disposed generally parallel to each other.

Figure 11:
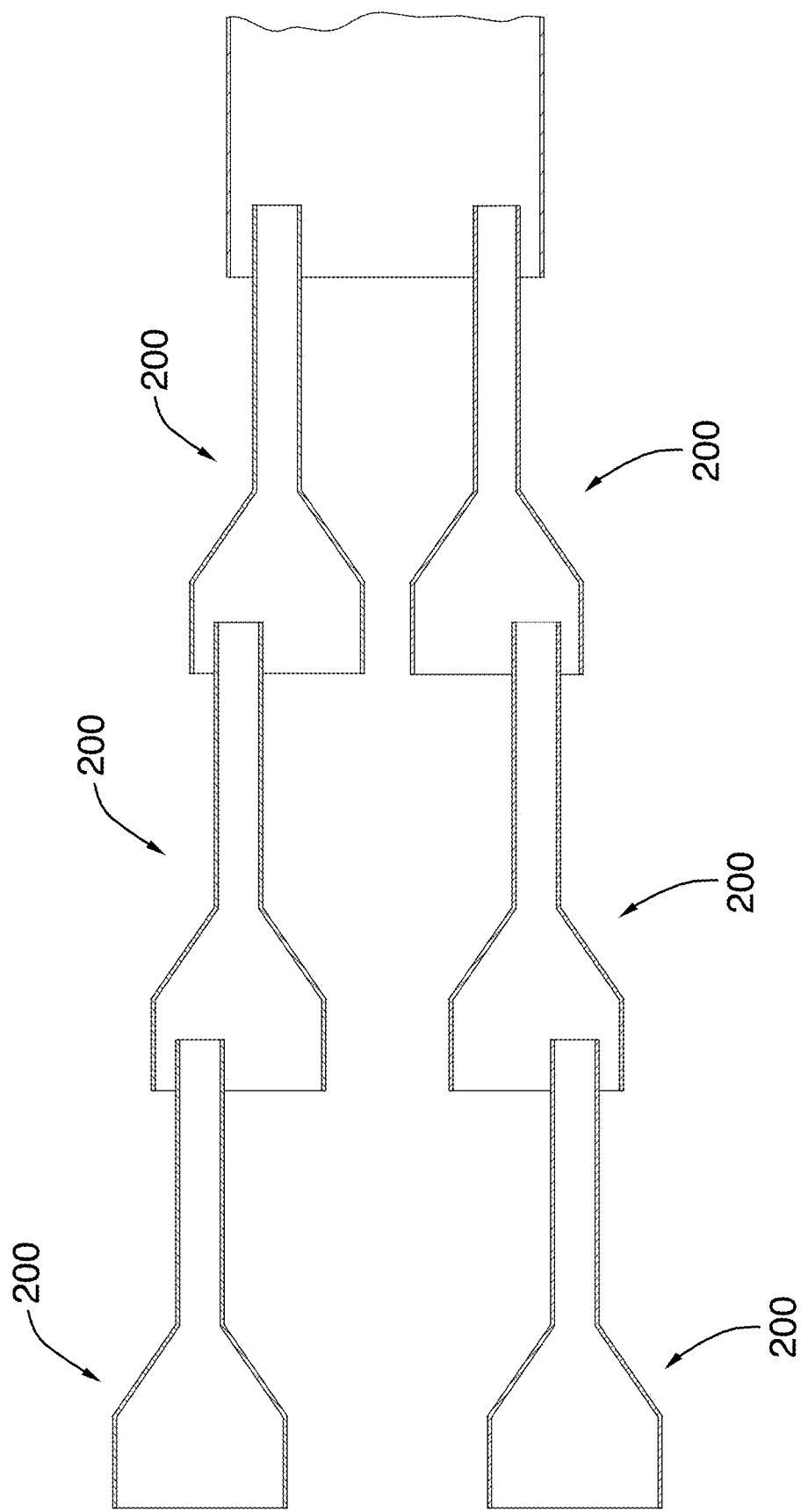
FIG. 11 is a diagrammatic side cross-sectional view of a plurality of venturi devices configured to feed water into a subaquatic power generation system according to one implementation.

Referring to FIG. 11, in some embodiments the single venturi constriction shown in FIG. 1 can be replaced by a plurality of smaller venturi devices 200. In the implementation shown in FIG. 11 there are a total of six venturi devices 200, with two sets of three devices positioned in series, the sets being positioned in parallel. This is but one example of many possible configurations. The use of a plurality of smaller venturi devices allows for a strong increase in flow rates without the need for the large funnel area 22 as shown in FIG. 1. This can be advantageous on applications where vertical space is limited but horizontal space (e.g., along the length of the bed of the waterway) is not.

The venturi devices 200 are preferably spaced sufficiently far apart so that the turbulence caused by each venturi device will dissipate and the normal tidal flow to recover, in some cases to full strength, before entering the next venturi device. Thus, the next venturi device in line will receive the full power of the tidal flow plus the increased flow from the previous venturi feeding directly into it.

Also, each waterwheel can have more or fewer paddles than shown and discussed above, and/or the paddles can be of a different shape, for example the blade of the paddle may be curved when seen in profile rather than straight.

Moreover, if the system is to be used in an application in which current only flows in a single direction continuously, e.g., a river, it may in some cases not be necessary to include a constriction and funnel on both ends of the housing. Doing so, however, may help to prevent excessive turbulence at the outlet end of the device.

As noted above, any desired method can be used to convert the kinetic energy generated by the system, including the use of other types of water pumps instead of the plunger pump provided as an example above.

Figure 12:
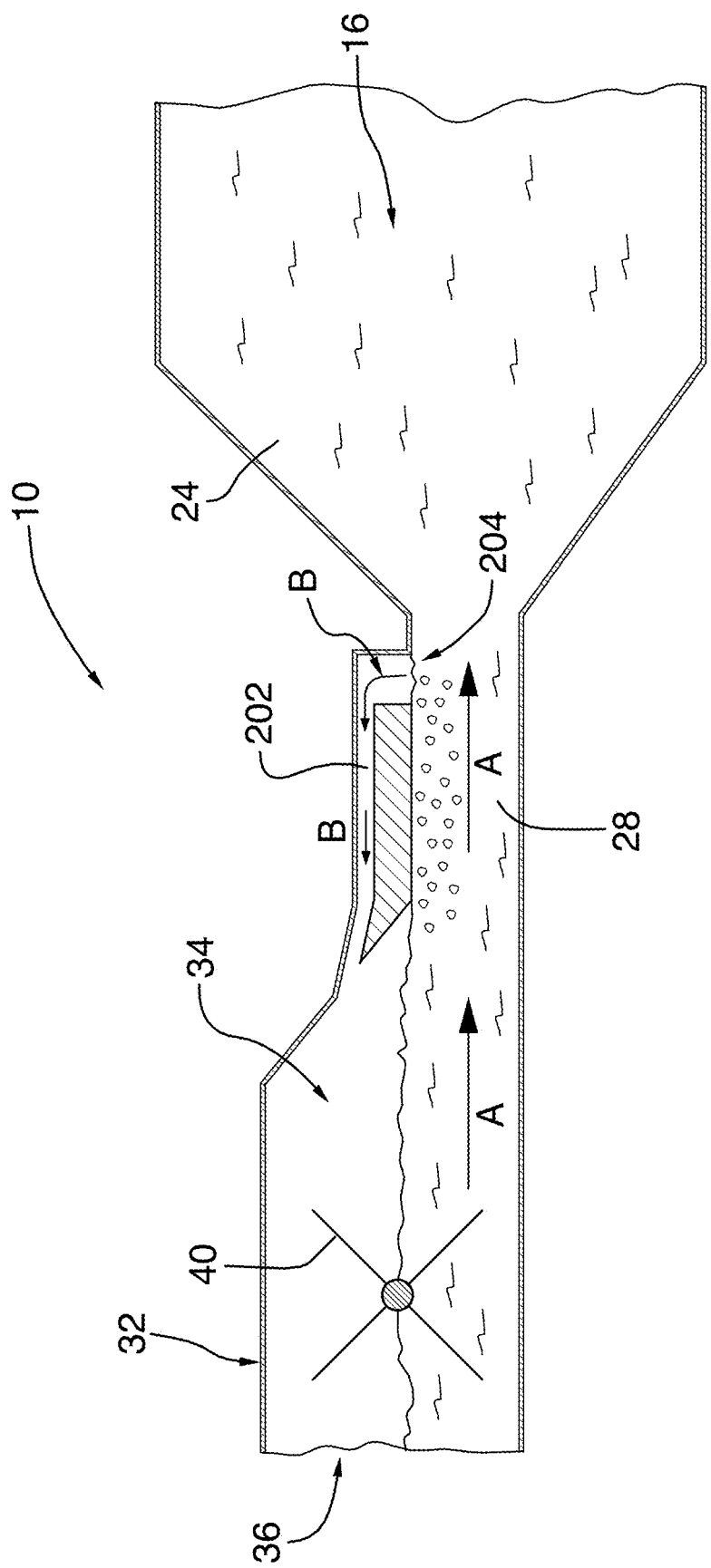
FIG. 12 is a diagrammatic side cross-sectional view showing a device configured to minimize loss of air from an air pocket in a subaquatic power generation system.

Additionally, the subaquatic power generation system can include devices configured to prevent air from escaping from the air pockets in which the waterwheels are disposed due to turbulence, and/or replacing air that escapes from the air pockets. For example, as shown in FIG. 12, an air return 202 can be provided as a sealed passage extending between the chamber 34 and the constriction 28. This air return 202 is configured to allow air bubbles, created by turbulence as the water flows in the direction indicated by arrows A, to escape the water at opening 204. This air can then pass through the air return 202 as indicated by arrows B and reenter the air pocket above the waterwheel.

In some implementations, the system may be relatively narrow relative to the width of the waterway, and a plurality of systems can be positioned side by side across the width of the waterway to take advantage of much of the width of the waterway. The use of a plurality of narrower systems, rather than a single very wide system, may facilitate transport of the system(s) to the site and installation and maintenance of the systems.

Accordingly, other embodiments are within the scope of the following claims.

What is claimed is:

1. A subaquatic power generation system comprising:
a housing having an inlet, an outlet, at least one of the inlet and outlet including a funnel-shaped region, and, between the inlet and outlet, a central portion including a lower portion defining an enclosed channel through which water can pass in a fluid flow direction, and an upper portion, above the lower portion,
wherein the central portion of the housing includes an elongated venturi constriction positioned between the upper portion and the funnel-shaped region, the constriction being configured to accelerate fluid flow through the channel and having a cross-section smaller than that of the central portion, and
wherein the upper portion of the central portion extends above upper walls of the venturi constriction to provide an air pocket within the upper portion when the housing is fully submersed in water; and
a waterwheel disposed within the central portion, with an upper portion of the waterwheel extending into the air pocket in the upper portion of the housing,
wherein a longitudinal axis of the waterwheel is oriented generally horizontally and generally perpendicular to the fluid flow direction, and a lower portion of the waterwheel is disposed within the enclosed channel and acted upon by fluid flow through the enclosed channel.

2. The system of claim 1 wherein the waterwheel has a diameter and a length, and the length of the waterwheel is greater than its diameter.

3. The system of claim 1 wherein the air pocket is located directly above the channel and the channel defines a maximum water level within the housing.

4. The system of claim 3 wherein the longitudinal axis of the waterwheel is positioned to be approximately at the maximum water level.

5. The system of claim 1 wherein the housing is configured for fluid flow in the fluid flow direction and a second, opposite direction, in response to tidal currents.

6. The system of claim 1 comprising a plurality of waterwheels positioned in the central portion.

7. The system of claim 6 wherein the waterwheels are disposed in separate modular portions of the central portion, the modular portions being configured to allow a waterwheel to be removed from the system.

8. The system of claim 7 wherein each of the modular portions includes a flanged portion at a first end and a tubular portion at a second end and the modular portions are connected in series by joining a flanged end of one modular portion to a tubular end of an adjacent module.

9. The system of claim 6 wherein the waterwheels are arranged with their longitudinal axes parallel to each other such that all of the longitudinal axes of the waterwheels are arranged perpendicular to the fluid flow direction.

10. The system of claim 9 wherein the waterwheels are arranged with their longitudinal axes perpendicular to a longitudinal axis of the housing.

11. The system of claim 1 wherein the waterwheel comprises an axle and a plurality of paddles extending outwardly from the axle.

12. The system of claim 11 further comprising a pump assembly mounted on the axle such that rotation of the axle actuates the pump assembly.

13. The system of claim 1 wherein the inlet comprises a generally rectangular flange and a funnel-shaped region disposed between the flange and a first venturi constriction.

14. The system of claim 13 wherein the outlet comprises a generally rectangular flange and a funnel-shaped region disposed between the flange and a second venturi constriction.

15. The system of claim 1 wherein at least one of the venturi constrictions comprises a plurality of venturi devices arranged in series.

16. The system of claim 1 further comprising a device configured to prevent air from escaping from the air pocket.

17. The system of claim 1 wherein the inlet and outlet are each provided with a screen.

18. The system of claim 1 wherein the central portion of the housing includes a first elongated venturi constriction positioned between the central portion and the inlet, and a second elongated venturi constriction positioned between the central portion and the outlet, each of the constrictions being configured to accelerate fluid flow through the channel and having a cross-section smaller than that of the central portion.

19. A subaquatic power generation system comprising:
a housing having an inlet, an outlet, and, between the inlet and outlet, a central portion including a lower portion defining an enclosed channel through which water can pass in a fluid flow direction, and an upper portion, above the lower portion, providing a power generating area defining a watertight and airtight chamber configured to provide an air pocket within the housing when the housing is fully submersed in water;

wherein the central portion of the housing is generally rectangular in cross-section, the housing includes a first constriction positioned between the central portion and the inlet, and a second constriction positioned between the central portion and the outlet, each of the constrictions having a generally rectangular cross-section smaller than that of the central portion, and an upper portion of the central portion extends above upper walls of the first and second constrictions, defining the air pocket, and a waterwheel disposed within the central portion, with an upper portion of the waterwheel extending into the power generating area, wherein a longitudinal axis of the waterwheel is oriented generally horizontally and generally perpendicular to the fluid flow direction, and a lower portion of the waterwheel is disposed within the enclosed channel and acted upon by fluid flow through the enclosed channel;

wherein the inlet includes a generally rectangular flange and a funnel disposed between the flange and the first constriction.

20. The system of claim 19 wherein the outlet includes a generally rectangular flange and a funnel disposed between the flange and the second constriction.

21. A subaquatic power generation system comprising:
a housing having an inlet, an outlet, and, between the inlet and outlet, a central portion including a lower portion defining an enclosed channel through which water can pass in a fluid flow direction, and an upper portion, above the lower portion, providing a power generating area defining a watertight and airtight chamber configured to provide an air pocket within the housing when the housing is fully submersed in water; and a plurality of waterwheels disposed in separate modular portions of the power generating area configured to allow a waterwheel to be removed from the system, with an upper portion of each waterwheel extending into the power generating area, wherein a longitudinal axis of each waterwheel is oriented generally horizontally and generally perpendicular to the fluid flow direction, and a lower portion of each waterwheel is disposed within the enclosed channel and acted upon by fluid flow through the enclosed channel;

wherein the modular portions are detachable from each other to allow a waterwheel to be removed from the system.

22. The system of claim 21 wherein each of the modular housing portions includes a flanged portion at a first end and a tubular portion at a second end and the modular housing portions are connected in series by joining a flanged end of one modular housing portion to a tubular end of an adjacent module.

* * * * *